Figure 1:
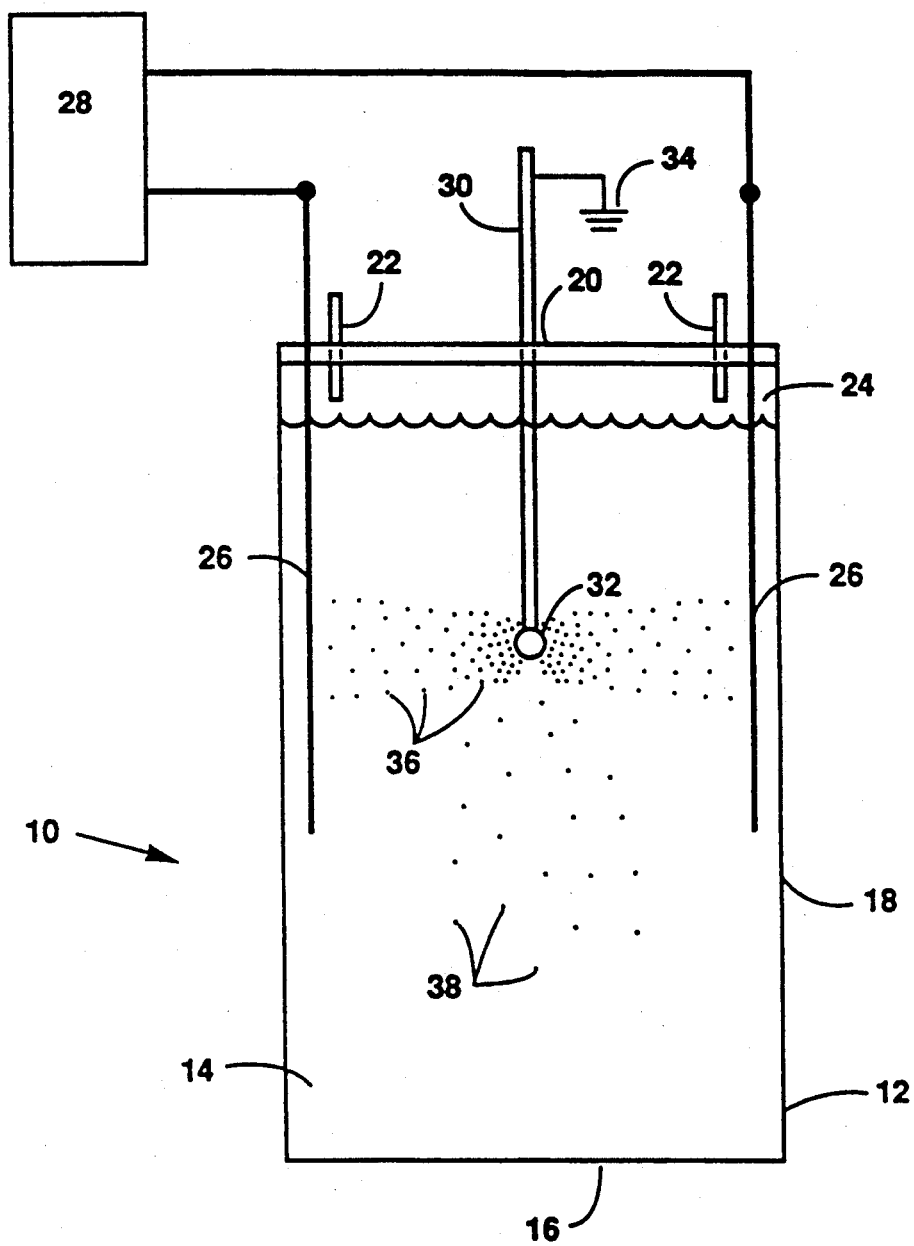

United States Patent [19]

Harris et al.

[11] Patent Number: 5,207,973
[45] Date of Patent: May 4, 1993

[54] METHOD AND APPARATUS FOR THE PRODUCTION OF METAL OXIDE POWDER

[75] Inventors: Michael T. Harris; Timothy C. Scott, both of Knoxville; Charles H. Byers, Oak Ridge, all of Tenn.

[73] Assignee: Martin Marietta Energy Systems, Inc., Oak Ridge, Tenn.

[21] Appl. No.: 832,091

[22] Filed: Feb. 6, 1992

Related U.S. Application Data

[62] Division of Ser. No. 441,793, Nov. 27, 1989, Pat. No. 5,122,360.

[51] Int. Cl.$^5$ .............................................. C22B 3/00
[52] U.S. Cl. .................................................... 266/170
[58] Field of Search ...................... 266/170; 501/12, 1; 204/186

[56] References Cited

U.S. PATENT DOCUMENTS

| | | | |
|---|---|---|---|
| 4,543,341 | 9/1985 | Barringer et al. | 501/1 |
| 4,661,226 | 4/1987 | Mintz et al. | 204/186 |
| 4,764,357 | 8/1988 | Sherif et al. | 423/338 |
| 4,767,515 | 8/1988 | Scott et al. | 204/186 |
| 4,981,819 | 1/1991 | Rinn | 501/12 |
| 5,122,360 | 6/1992 | Harris et al. | 501/1 |

OTHER PUBLICATIONS

Slamovich, et al, "Spherical Zirconia Particles via Electrostatic Atomization . . . " *Mat. Res. Soc. Proc.* vol. 121, Dec. 1988, pp. 257–262.

Matijevic, "Preparation and Interaction of Colloids of Interest in Ceramics" *Ultrastructure Processing of Advanced Ceramics* Dec. 1988, pp. 429–442.

Clinton, Sam D., Mass Transfer of Water from Single Aqueous Sol Droplets Fluidized in a Partially Miscible Alcohol, Dec. 1972.

*Primary Examiner*—Scott Kastler
*Attorney, Agent, or Firm*—Joseph A. Marasco; Harold W. Adams

[57] ABSTRACT

The present invention provides a method for preparing metal oxide powder. A first solution, which is substantially organic, is prepared. A second solution, which is an aqueous solution substantially immiscible in the first solution, is prepared and delivered as drops to the first solution. The drops of the second solution are atomized by a pulsed electric field forming micro-drops of the second solution. Reagents in the first solution diffuse into and react with reactants in the micro-drops of the second solution forming metal hydroxide or oxalate particles. The metal hydroxide or metal oxalate particles are then recovered and dried to produce the metal oxide powder. An apparatus for preparing a metal oxide powder is also disclosed.

3 Claims, 2 Drawing Sheets

METHOD AND APPARATUS FOR THE PRODUCTION OF METAL OXIDE POWDER

This application is a division of U.S. Ser. No. 07/441,793, filed Nov. 27, 1989, now U.S. Pat. No. 5,122,360, issued on Jun. 16, 1992.

The present invention relates to methods and apparatus for forming metal oxide particles and powders.

The development of new ceramic materials is sometimes hindered by the ability to reproducibly synthesize high quality starting powders. The ability to control the solid morphology of materials formed from powders is largely dependent upon controlling particle size and size distribution and upon minimizing particle-particle interaction. Small particles with a narrow range of particle size distribution are generally desired. Alternatively, a good distribution of particle sizes may include relatively large particles which form the bulk of the material as well as smaller particles used for filling the interstitial spaces between the larger particles during manufacture.

A number of methods have been developed to form monodisperse powders (i.e., particles with a narrow range of particle size distribution and low tendency toward agglomeration) by chemical methods such as the controlled homogeneous precipitation of metal oxides from metal alkoxide by hydrolysis in organic liquid systems. These methods prove to be quite good at producing high purity metal oxide powders. In many cases, however, the conditions which are favorable for metal alkoxide hydrolysis and the subsequent metal oxide precipitation are not amenable to minimizing particle-particle interactions and, consequently, the powders form agglomerates and become polydispersed. Other attempts to produce monodispersed metal oxide powders using the technique of metal alkoxide hydrolysis have involved the use of mechanical stirrers to disperse the aqueous phase in the organic liquid system. These techniques are energy intensive and generally do not produce metal oxide powders with the desired size distribution.

Therefore, it is an object of the present invention to provide a method for preparing metal oxide particles within a desired range of size distribution and with a minimum of particle-particle interactions. It is a further object of the present invention to provide a method and apparatus for preparing monodisperse metal oxide powders which possess optimum morphology and surface properties for use as ceramic precursors.

In general, this invention relates to processes of forming monodispersed powders by forcing particle growth in localized reaction zones. These reaction zones are created by the dispersion of micro-droplets of an aqueous phase within an organic phase. Small particles (0.1–5 micrometers) are produced because the diffusion and reaction in the dispersed micro-droplet occurs very rapidly. Formation and dispersion of submicron-sized micro-droplets within a relatively nonconducting continuous phase is accomplished through the use of high-intensity-pulsed electric fields, i.e. pulsed fields with strengths greater than 1 kilovolt per centimeter.

The present invention provides a method for preparing metal oxide powders. The method comprises preparing a first solution which is a substantially organic solution. A second solution, comprising an aqueous solution that is substantially immiscible in the first solution, is prepared and delivered to the second solution as drops. The drops of the second solution are atomized by a pulsed electrical field forming micro-drops of the second solution solution. Reagents in the first solution diffuse into and react with the micro-drops of the second solution and form metal hydroxide or metal oxalate particles. The particles are then recovered and dried to produce the metal oxide powder.

In one embodiment of the present invention the first solution comprises a metal alkoxide and the second solution comprises an aqueous solution. The aqueous solution is chosen from the group consisting of neutral, acidic and basic aqueous solutions. In another embodiment of the invention, the first solution is a liquid metal alkoxide. Other embodiments of the invention include those where the metal alkoxide comprises a metal chosen from the group consisting of main group metals, transition metals, alkali and alkaline earth metals and lanthanides and actinides. The alkoxide is chosen from the group consisting of derivatives of straight chain and branched chain alcohols.

Another embodiment of the present invention provides that the first solution comprises an alcohol and the second solution comprises an aqueous solution with a water soluble metal salt. In one embodiment of the invention the first solution comprises an alcohol and ammonia. In additional embodiments of the invention the water soluble metal salt comprises a metal chosen from the group consisting of main group metals, transition metals, alkali and alkaline earth metals and lanthanides and actinides. In addition, precipitation agents are chosen from the group consisting of Ammonium Hydroxide and oxalic acid. The alcohol in another embodiment of the invention comprises straight chain and branched chain alcohols having more than two carbons in the chain.

In one embodiment of the invention a pulsed electrical field is generated by producing a direct current (D.C.) voltage offset with superimposed voltage spikes. The voltage level of the spikes is between about two kilovolts per centimeter and about 100 kilovolts per centimeter with the constant D.C. offset being about 50% of this value. The voltage spikes of the electric field are produced at a frequency of between about 100 Hz and about 3000 Hz.

The present invention also provides for an apparatus for preparing metal oxide powders. The apparatus comprises a reaction vessel containing a first solution that is substantially an organic solution and a container for a second solution comprising an aqueous solution that is substantially immiscible in the first solution. Means are provided for delivering the second solution as drops to the first solution. Also, means are provided for producing and applying a pulsed electrical field to the first solution. The pulsed electrical field fractures the drops of the second solution forming micro-drops. The first solution then reacts with the micro-drops of the second solution and forms metal hydroxide on metal oxalate particles. The particles are heat treated to produce a metal oxide powder.

During a typical operation, a drop of the aqueous solution is introduced into a continuous phase of a substantially organic solution. The aqueous solution is introduced through a nozzle which is grounded. An electric field is applied to the first solution by means of electrodes which are placed in the first solution in the vicinity of the grounded nozzle. A voltage is applied to the electrodes such that the electric field generated between the electrodes and the grounded nozzle is greater than about 2 kilovolt per centimeter. The electric field is comprised of a direct current (D.C.) voltage, offset at a predetermined voltage level between about 2 kilovolts per centimeter and about 7 kilovolts per centimeter which is created by introducing voltage spikes to the system. The voltage spikes occur at a frequency of between about 100 Hz and about 3,000 Hz. The peak voltage level of the voltage spikes is between about 2 kilovolts per centimeter and about 100 kilovolts per centimeter. The presence of the pulsed electric field atomizes the drops of the aqueous solution into submicron sized micro-drops. These drops are then dispersed into the continuous phase.

When the continuous phase contains a liquid metal alkoxide and the aqueous droplets contain water which is either neutral, acidic or basic, then it is believed that the following reactions take place in the micro-droplets. It is believed that initially there is a hydrolysis reaction as is shown in reaction (1). The metal is designated by "M" and has a valence n.

$$M(OR)_n + nH_2O \rightarrow M(OH)_n(ppt.) + nROH \quad (1)$$

The metal alkoxide is converted in the presence of water into a metal hydroxide with the alkoxide coming off as alcohol, ROH. The metal hydroxide particles then precipitate out of the solution. The metal hydroxide, M $(OH)_n$, is then collected and dehydrated in a dryer according to reaction (2) forming the metal oxide.

$$M(OH)_n \rightarrow MO_{n/2} + (n/2)(H_2O) \quad (2)$$

The metal oxide powders produced by this method are highly porous shells and flakes. The powder is a fine, homogeneous, free-flowing metal oxide. The powder may be used for packaging material (i.e., for electronic components) or, because of their high surface area, as chromatographic and catalytic support materials.

Rather than having the metal as a metal alkoxide in the continuous phase, the metal may be a part of a water soluble metal salt which is dissolved in the aqueous drops. In this case, the continuous phase comprises an alcohol or an alcohol with oxalic acid. In operation, the formation of the micro-drops is similar to that described above. The reactions forming the metal hydroxide or metal oxalate particles and metal oxide powders, reactions (3)-(5) are believed to be similar to reactions (1) and (2) above.

The formation of a metal oxide powder from an alcoholic continuous phase is believed to follow the steps shown in reactions (3) and (4).

$$M^{n+} + nOH^- \rightarrow M(OH)_n(ppt.) \quad (3)$$

$$M(OH)_n \rightarrow MO_{n/2} + (n/2)(H_2O) \quad (4)$$

The formation of a metal oxide powder from an alcoholic continuous phase containing oxalic acid is shown in reactions (5) and (6).

$$mM^{n+} + (mn/2)H_2C_2O_4 \rightarrow M_m(C_2O_4)_{(mn/2)}(ppt.) + mnH^+ \quad (5)$$

$$M_m(C_2O_4)_{(mn/2)} + (mn/2)O_2 \rightarrow mMO_{n/2} + mnCO_2 \quad (6)$$

The metal oxide powders formed using the water soluble metal salts comprise dense, spherical particles. These dense particles are also suitable for forming high-density ceramic articles.

BRIEF DESCRIPTION OF THE DRAWINGS

The present invention may be best understood by reference to the following detailed description of an exemplary embodiment when considered in conjunction with the drawings in which:

FIG. 1 is a diagram of a first embodiment of the invention which employs a batch process; and FIG. 2 is a diagram of a second embodiment of the invention which employs a continuous process.

Referring now to the drawings in which like reference characters designate like or corresponding parts throughout the several views, there is shown in FIG. 1 an embodiment of an apparatus 10 for producing metal oxide powder in accordance with the present invention. The depicted apparatus 10 generally comprises a reaction vessel 12 for containing a continuous organic phase 14. The reaction vessel 12 may be of any number of shapes but in one embodiment the reaction vessel 12 is an open cylinder with a closed bottom 16 joined to the cylindrical side wall 18. The continuous organic phase 14 is loaded into the reaction vessel 12. A reaction vessel cover 20 is placed onto the top of the reaction vessel 12 providing a gas tight seal at the side wall 18. The reaction vessel cover 20 is fitted with ports 22 for purging the head space 24 of the reaction vessel.

The reaction vessel 12 is also fitted with electrodes 26 which are placed in intimate contact with the continuous organic phase 14 and then continue through the head space 24 and the reaction vessel cover 20 to a pulsed electric field source 28. The pulsed electric field source 28 provides a pulsed electric signal which creates an offset D.C. voltage with superimposed spikes.

There is also provided a nozzle 30 for the delivery of drops of the aqueous solution 32. The nozzle 30 is constructed of conductive material such as metal and is connected to an electrical ground 34. The presence of a pulsed field on the electrodes 26 and ground 34 at the nozzle 30 generates a pulsed electric field between the electrodes 26 and the nozzle 30. Upon exit from the nozzle 30, the drop of aqueous solution 32 is fractured into aqueous micro-drops 36. The micro-drops 36 react with the continuous organic phase 14 and form solid metal hydroxide particles 38 which drop to the bottom of the reaction vessel 12. Upon the completion of the addition of the drops of aqueous solution 32 to the continuous organic phase 14 in the presence of the pulsed electric field the resulting metal hydroxide particles 38 are recovered, filtered or centrifuged and dried to produce the metal oxide powder.

The metal is contained in the continuous organic phase 14 or in the drops of aqueous solution 32 as desired. The metal is present as a metal alkoxide when it is present in the continuous organic phase 14 and it is present as a water soluble metal salt when it is in the drops of aqueous solution 32.

In operation, the apparatus 10 is prepared by filling the reaction vessels 12 with the continuous organic phase 14. In the following description it will be assumed that the continuous organic phase comprises a metal alkoxide and that the drops of aqueous solution comprise an aqueous solution that is either neutral, basic or acidic. A similar operation is used where the continuous organic phase 14 comprises an alcohol and the drops of aqueous solution 32 comprise a water soluble metal salt in water.

The reaction vessel cover 20 is placed on the reaction vessel 12 and the head space 24 is purged with the ports 22. The purging usually involves the replacement of air in the head space 24 with a nonflammable gas such as nitrogen. A pulsed electric field is developed between the electrodes 26 and the nozzle 30. This electric field contains two components: a D.C. voltage offset of between about 2 kilovolts per centimeter and about 7 kilovolts per centimeter; and a pulsed signal with a peak voltage of between about 2 kilovolts per centimeter and about 100 kilovolts per centimeter. The spikes are pulsed at a frequency between about 100 Hz and about 3,000 Hz.

Drops of the aqueous solution 32 are introduced into the continuous organic phase 14 and are immediately atomized by the pulsed electric field creating aqueous micro-drops 36. These micro-drops 36 have sizes in the micrometer range and are dispersed throughout the continuous organic phase 14. The continued application of the pulsed electric field maintains the micro-drops in a dispersed state throughout the continuous organic phase 14. The metal alkoxide of the continuous organic phase 14 reacts with the aqueous solution of the micro-drops 36 forming metal hydroxide particles 38 which precipitate out of the continuous organic phase 14. The reaction of the metal alkoxide with the aqueous micro-drops 36 is sufficiently rapid that an entire micro-drop 36 is converted to a metal hydroxide particle 38. The metal hydroxide particle 38 that is formed is smaller than the aqueous micro-drops 36 from which it formed.

Aqueous micro-drops 36 are added to the continuous organic phase 14 for a period of about 10 minutes. At the end of that time, the pulsed electric field is removed and the metal hydroxide particles 38 are allowed to settle to the bottom 16 of the reaction vessel 12. The reaction vessel cover 20 is removed and the continuous organic phase 14 containing the metal hydroxide particles 38 is filtered to recover the metal hydroxide particles 38. The particles 38 are washed and heat treated for the metal oxide.

The dried product is a fine, homogeneous, free-flowing metal oxide powder. The powder particles have sizes that range from about 0.1 micrometers to about 2 micrometers and are porous and flaky when dried.

A similar procedure is followed when the continuous organic phase 14 comprises an alcohol and the drops of aqueous solution 32 comprise a water soluble metal salt dissolved in an aqueous solution. The metal oxide powders which result from that combination of solutions are generally dense and spherical.

Figure 2:
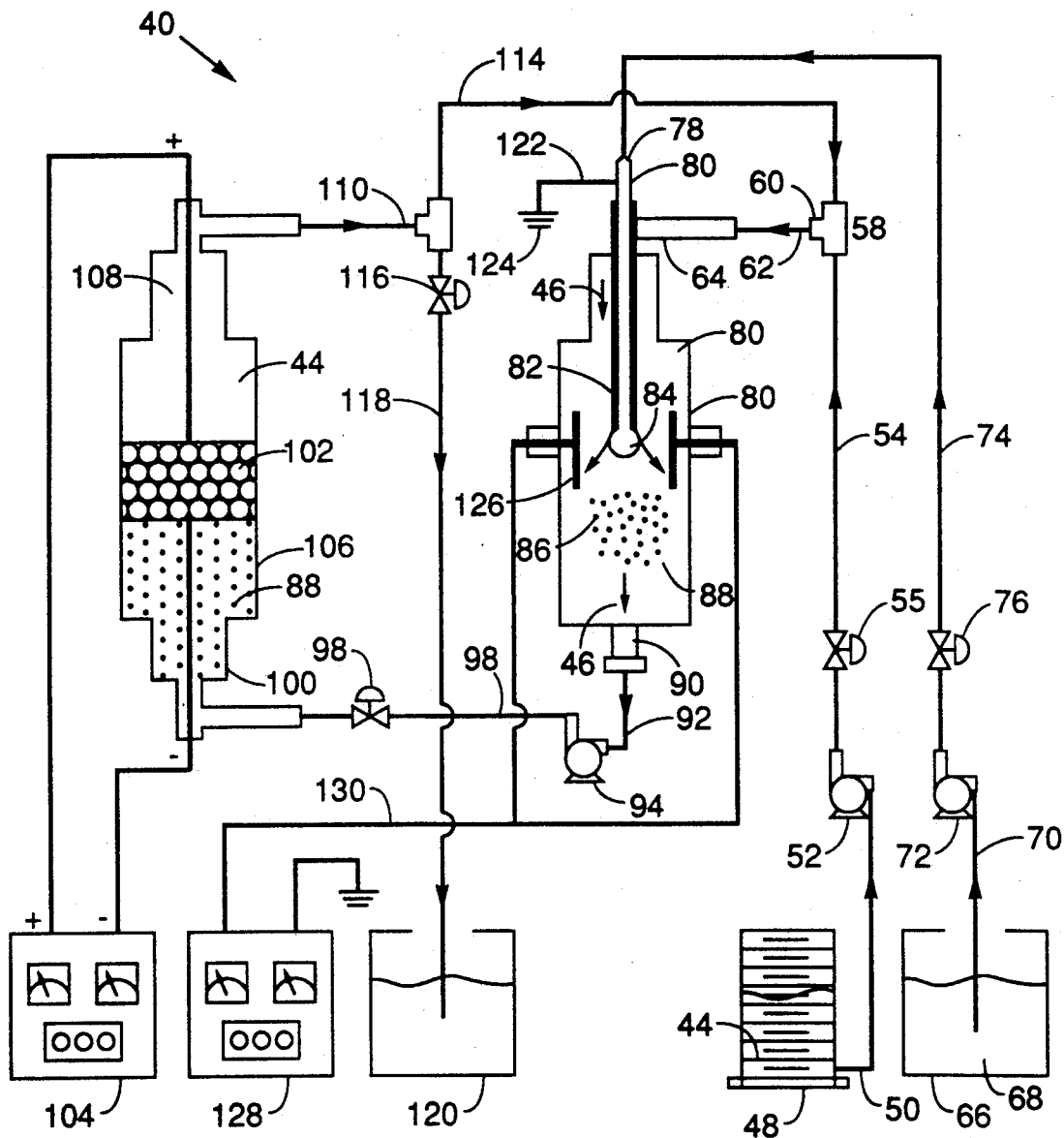

There is shown in FIG. 2 a diagram of another embodiment of the present invention, a apparatus 40 for the continuous production of metal oxide powder. The apparatus comprises a reaction vessel 42 which contains a continuous organic phase 44. The organic phase 44 is moved through the reaction vessel 42 in the direction of the arrows 46. The organic phase 44 is supplied from an organic phase storage 48 which is external to the reaction vessel 42. The organic phase 44 is supplied to the reaction vessel 42 from the storage 48 along conduit 50 to an organic phase supply pump which is of a type such as a Masterflex pump. The supply pump 52 is connected to the reaction vessel 42 by conduit 54 which contains a supply shut-off valve 56. The opposite end of conduit 54 is connected to a T-connector 58 which output is connected to conduit 62 which is connected to reaction vessel organic phase connection 64.

An aqueous phase storage 66 contains the aqueous phase 68 which is supplied to the reaction vessel 42. A conduit 70 connects the aqueous phase storage 66 with an aqueous phase supply pump 72. The output of the aqueous phase supply pump 72 is connected to a conduit 74 which contains an aqueous phase supply shut-off valve 76. The opposite end of conduit 74 is attached to the distal end 78 of an aqueous phase nozzle 80. The aqueous phase 68 travels down the aqueous phase nozzle 80 to the proximal end 82 which is submerged in the continuous organic phase 44 of the reaction vessel 42. A drop 84 of the aqueous phase 68 is released from the proximal end 82 of the aqueous phase nozzle into the continuous organic phase 44. In a process to be described in more detail hereinafter, the drop 84 is atomized into micro-drops 86 which react with the continuous organic phase 14 to form metal hydroxide particles 88.

The metal hydroxide or metal oxalate particles 88 and continuous organic phase 44 are removed from the reaction vessel 42 at the exit port 90. The exit port 90 is connected to the conduit 92, the distal end of which is connected to a product pump 94. The organic continuous phase 44 containing the metal oxide particles 88 is pumped along a conduit 96, through a valve 98, to an electrical bed filtration unit 100. In the electrical bed filtration unit 100 a filter element 102, such as glass beads, is in electrical connection with a filter power supply 104, such as a Hypotronics Model 825C High Voltage D.C. Power Supply. The filter power supply 104 applies a voltage across the filter unit 102 thereby trapping the metal hydroxide or metal oxalate particles 88 on the particulate side 106 of the electrical bed filter unit 100 and allowing the continuous organic phase 44 to pass through the filter unit 102 to the filtrate side 108 of the filtration unit 100. The filtrate is then returned to the reaction vessel along the conduit 110 to the T-connector 112. A second end of T-connector 112 is connected to conduit 114 which proximal end is joined to T-connector 58 thereby returning the continuous organic phase 44 to the reaction vessel 42. Alternatively, the valve 116 may be opened to allow the passage of the continuous organic phase 44 to travel along a conduit 118 to a filtrate storage unit 120.

The aqueous phase nozzle 80 of the reaction vessel 42 is connected by a connector 122 to an electrical ground 124. There are electrodes 126 which are submerged in the continuous organic phase 44 of the reaction vessel 42 in the vicinity of the proximal end 82 of the aqueous phase nozzle 80. The electrodes 126 are connected to an electrical field power supply 128, such as a Velonix Model 660 High Voltage Pulse Generator, through the wire 130. The electrical field power supply 128 supplies an electrical signal to the electrodes 126 which is comprised of an offset D.C. voltage which has voltage spikes riding atop the D.C. offset. The voltage applied to the electrodes 126 from the electrode power supply 128 may be positive or negative without affecting the efficiency of the system. The presence of the pulsed electric field generated between the electrodes 126 and the grounded aqueous phase nozzle 80 operates to atomize the drop 84 into micro-droplets 86. Those micro-droplets 86 then react with the continuous organic phase 44 producing the metal hydroxide or metal oxalate particles 88.

In operation, the reaction vessel 42 is loaded with a continuous organic phase 44 from the organic phase storage unit 48. When the reaction vessel 42 is at its capacity, the continuous organic phase 44 is recirculated through the electrical bed filtration unit via the conduit 92, the product pump 94, the conduit 96, the valve 98, the electrical bed filtration unit 100, the conduit 110, the T-connection 112, the conduit 114, the T-connection 58 and the conduit 62. This recirculation is continued until such time as the continuous organic phase 44 is exhausted. At that time, the valve 116 in the conduit 118 is opened and the exhausted continuous organic phase 44 is placed into the filtrate storage unit 120.

The aqueous phase 68 is loaded into the reaction vessel 42 from the aqueous phase storage 66. The aqueous phase 68 is applied dropwise to the continuous aqueous phase 44. As each drop 84 emerges from the proximal end 82 of the aqueous phase nozzle 80 it is atomized into micro-drops 86 by the pulsed electrical field generated between the electrodes 126 and the ground 124 attached to the aqueous phase nozzle 80. The reagents in the continuous organic phase 44 reacts with the aqueous solution 68 in the micro-drops 86 forming the metal hydroxide or metal oxalate particles 88. The continuous organic phase 44 and the metal hydroxide particles 88 are swept toward the exit port 90 of the reaction vessel 44 and into the recirculation loop. In the electrical bed filtration unit 100, the metal oxide particles 88 are trapped by the filter element 102 on the particulate side 106 of the filtration unit 100. The continuous organic phase 44 is then returned to the reaction vessel 42 as previously described.

The metal hydroxide or metal oxalate particles 88 may be removed from the electrical bed filtration unit 100 and recovered by washing and drying to produce a metal oxide powder. The powers produced using this apparatus are fine, homogeneous and free-flowing.

In order to provide a better understanding of the present invention the following examples are given by way of illustration and not by way of limitation.

EXAMPLE 1

A reaction vessel was filled with a continuous organic phase comprising a metal alkoxide of a type listed in Table I. A pulsed electric field with a field strength of 5 kV/cm offset D.C. with 10 kV/cm spikes was applied to the continuous phase. An aqueous disperse phase of the type listed in Table I was injected into the continuous phase from a grounded 0.125 cm syringe tip in the vicinity of the pulsed electric field. The drops emerging from the syringe tip were readily atomized into micro-drops which were dispersed in the continuous phase. The continuous phase reacted immediately with the micro-drops to form the metal hydroxide particles. The metal hydroxide was formed in yields of greater than 99.5%. Upon completion of the addition of the aqueous phase, the reaction solution was filtered and the metal hydroxide was recovered. The metal hydroxide was dried at 100° C. for 24 hours. Table I lists a description of the final hydrous metal oxide powder. In all cases, the powders were fine, homogeneous, monodisperse, free-flowing powders.

TABLE I

| Sample | Continuous Phase | Disperse Phase | Product |
|---|---|---|---|
| A | TEOS[1] | 0.7M NH$_3$ in water | Porous silica shells |
| B | 2-EH[2] with TIE[3]/ASB[4] (1/3) | water | Well mixed submicron powder containing hydrous alumina and titania in a molar ratio of 3:1 |
| C | 2-EH with TIE/ABS[5] (3/1) | water | Well mixed submicron powder containing hydrous alumina and titania in a molar ratio of 3:1 |
| D | 2-EH with ASB/ZB[6] (2.6/1) | water | Well mixed submicron powder containing hydrous alumina and zirconia in a molar ratio of 2.6:1 |
| E | 2-EH with ABS/ZB (2.6/1) | water | Well mixed submicron powder containing hydrous alumina and zirconia in a molar ratio of 2.6:1 |

[1] Tetraethylorthosilicate
[2] 2-ethyl 1-hexanol
[3] titanium ethoxide
[4] aluminum sec-butoxide
[5] aluminum butoxide stearate
[6] zirconium butoxide

EXAMPLE II

A reaction vessel was filled with a continuous organic phase comprising an alcohol mixture of the type listed in Table II. A pulsed electric field with a field strength of 5 kV/cm offset D.C. and 5 kV/cm spikes was applied to the continuous phase. An aqueous disperse phase with a metal salt mixture of the type listed in Table II was injected into the continuous phase from a grounded 0.125 cm syringe tip in the vicinity of the pulsed electric field. The drops emerging from the syringe tip were readily fractured into micro-drops which were dispersed in the continuous phase. The continuous phase reacted immediately with the micro-drops to form the metal hydroxide or metal oxalate particles. The metal hydroxide or metal oxalate was formed in yields of greater than 99.5%. Upon completion of the addition of the aqueous phase, the reaction solution was filtered and the metal hydroxide was recovered. The metal hydroxide was dried at about 150° C. for 24 hours. Table II lists a description of the final metal oxide powder. In all cases, the powders were fine, homogeneous, monodisperse, free-flowing powders.

TABLE II

| Sample | Continuous Phase | Disperse Phase | Product |
|---|---|---|---|
| F | 2-EH/EtOH[7] (95:5 vol %) with 0.2M NH$_3$ | aqueous metal nitrate solution Y/Ba/Cu (1:2:3) | 0.1 to 2 micron spherical particles containing mixed oxide of Y, Ba and Cu with molar ratio of about (1:2:3) |
| G | 2-EH/EtOH (95:5 vol %) with 0.2M NH$_3$ | aqueous metal nitrate solution of Y | 0.1 to 2 micron spherical particles containing oxides of Y |
| H | 2-EH/EtOH (95.5 vol %) with 0.2M NH$_3$ | aqueous metal nitrate solution of Cu | 0.1 to 2 micron spherical particles containing oxides of Cu |
| I | 2-EH/CYHEX[8]/EtOH with 0.2M NH$_3$ | aqueous metal nitrate solution of Y/Ba/Cu (1:2:3) | Submicron sized spherical particles containing mixed oxide of Y, Ba and Cu with molar ratio of about (1:2:3) |
| J | 2-EH with 2% by weight of oxalic acid | aqueous metal nitrate solution of Y | Submicron sized spherical particles containing mixed oxide of Y |
| K | 2-EH with | aqueous metal | Submicron sized |

TABLE II-continued

| Sample | Continuous Phase | Disperse Phase | Product |
|---|---|---|---|
|  | 2% by weight of oxalic acid | nitrate solution of Ba | spherical particles containing mixed oxide of Ba |
| L | 2-EH with 2% by weight of oxalic acid | aqueous metal chloride solution of Cu | Submicron sized spherical particles containing mixed oxide of Cu |

[7]ethanol
[8]cyclohexane

It will be noted from the above that the present application provides for a method and apparatus for the production of metal oxide powders with particle sizes in the sub-micron range. It will also be noted that these particles are monodispersed and quite suitable for use as ceramic precursors. In addition, it may be seen that metal oxide powders which have porous and flaky particles may be produced as well as metal oxide powders which have spherical and dense particles.

Various of the features of the invention which are believed to be new are set forth in the appended claims.

What is claimed is:

1. An apparatus for reacting immiscible liquid reactant phases to form metal oxide particles comprising:
   a vessel for containing a liquid continuous phase reactant;
   a liquid drop delivering means for delivering a liquid dispersed phase reactant as drops into said liquid continuous phase reactant, said liquid drop delivering means being disposed so as to be submerged in said liquid continuous phase reactant, at least one of said liquid continuous phase reactant and said liquid dispersed phase reactant comprising a source of metal-containing ions;
   a pulse electric field applying means for producing and applying a pulsed electrical field to said liquid dispersed phase reactant, said pulsed electrical field applying means being disposed so as to be submerged in said liquid continuous phase reactant, said pulsed being capable of fracturing said drops of said liquid dispersed phase reactant to form micro-drops of said liquid dispersed phase reactant so that said liquid continuous phase reactant can react with said micro-drops of said liquid dispersed phase reactant to form metal hydroxide particles; and
   a drying means for drying said metal hydroxide particles to a metal oxide powder.

2. An apparatus in accordance with claim 1 wherein said delivering means comprises a grounded nozzle, and wherein said applying means comprises at least one electrode disposed in the vicinity of said grounded nozzle.

3. An apparatus in accordance with claim 2 wherein said applying means further comprises a power supply capable of producing an electric field of at least 2 kilovolts per centimeter between said nozzle and said electrode.

* * * * *